US008448817B2

(12) United States Patent
Bloechlinger et al.

(10) Patent No.: US 8,448,817 B2
(45) Date of Patent: May 28, 2013

(54) METHOD OF OPTIMIZING DOSAGE-DISPENSING PROCESSES, AND DOSAGE-DISPENSING DEVICE

(75) Inventors: Marc Bloechlinger, Uetikon am See (CH); Paul Luechinger, Uster (CH); Hansruedi Kuenzi, Greifensee (CH); Siegfried Gluvakov, Neuhaus (CH); Bruno Nufer, Illnau (CH); Jean-Christophe Emery, Zurich (CH)

(73) Assignee: Mettler-Toledo AG, Greifensee (CH)

( * ) Notice: Subject to any disclaimer, the term of this patent is extended or adjusted under 35 U.S.C. 154(b) by 1089 days.

(21) Appl. No.: 12/015,947

(22) Filed: Jan. 17, 2008

(65) Prior Publication Data

US 2008/0173668 A1    Jul. 24, 2008

(30) Foreign Application Priority Data

Jan. 19, 2007 (EP) .................................. 07100789

(51) Int. Cl.
| | |
|---|---|
| B67B 7/00 | (2006.01) |
| G01F 11/00 | (2006.01) |
| B67D 1/00 | (2006.01) |
| B67D 7/14 | (2010.01) |
| B65B 1/04 | (2006.01) |

(52) U.S. Cl.
USPC ........ 222/1; 222/52; 222/55; 222/59; 222/63; 222/64; 222/181.1; 141/2

(58) Field of Classification Search
USPC ................... 222/1, 52, 53, 55, 58, 59, 61, 63, 222/64, 181.1; 141/2, 359
See application file for complete search history.

(56) References Cited

U.S. PATENT DOCUMENTS

| 6,985,798 B2 * | 1/2006 | Crowder et al. ............... 700/240 |
| 7,624,769 B2 * | 12/2009 | Bartholomew et al. ........... 141/2 |
| 2006/0011653 A1 * | 1/2006 | Fontaine et al. ........... 222/181.1 |

FOREIGN PATENT DOCUMENTS

| DE | 197 23 218 A1 | 12/1998 |
| DE | 10 2004 022 519 A1 | 12/2005 |
| GB | 2 093 609 A | 9/1982 |
| WO | WO 02/44665 A2 | 6/2002 |
| WO | WO 2004/042334 A1 | 5/2004 |

OTHER PUBLICATIONS

European Search Report (with English translation of category of cited documents) dated Jun. 8, 2007.

* cited by examiner

*Primary Examiner* — Ryan Reis
(74) *Attorney, Agent, or Firm* — Buchanan Ingersoll & Rooney PC

(57) ABSTRACT

In the method of optimizing the dosage-dispensing process of a dosage-dispensing device, an examination takes place prior to a first dosage delivery, whether at least one flow parameter relating to the dosage-dispensing process is stored in the memory module of the dosage-dispensing unit. If a stored flow parameter is found to be present, said flow parameter is called up from the memory module. If no store flow parameter is present, a flow parameter is requested by the user by entering a request, a flow parameter is called up from a central database, or at least one flow parameter is determined by means of the first run of the dosage-dispensing process based on a default setting of the dosage-dispensing program. With the at least one flow parameter, the dosage-dispensing program is directly adapted, at least one run of the dosage-dispensing process is performed with the adapted dosage-dispensing program, and/or the at least one flow parameter is stored in the memory module. As a prerequisite for performing the method according to the invention, a dosage-dispensing device is required which comprises a drive device with a control- and regulation unit operable to execute a dosage-dispensing program, wherein a dosage-dispensing unit can be set in place in, and removed from, the drive device and wherein the dosage-dispensing unit is equipped with at least one memory module.

31 Claims, 4 Drawing Sheets

METHOD OF OPTIMIZING DOSAGE-DISPENSING PROCESSES, AND DOSAGE-DISPENSING DEVICE

RELATED APPLICATION

This application claims priority under 35 U.S.C. §119 to EP Application 07100789.2 filed in Europe on Jan. 19, 2007, the entire contents of which is hereby incorporated by reference in its entirety.

TECHNICAL FIELD

The present disclosure relates to the optimization of dosage-dispensing processes with a dosage-dispensing device, and it further relates to a device for dispensing measured doses of substances in powder- or paste form.

BACKGROUND INFORMATION

Dosage-dispensing devices are known for dispensing small quantities, for example of toxic substances, with high precision into small target containers. Frequently, such recipient containers are placed on a balance in order to weigh the substance delivered out of the dosage-dispensing device, so that the substance can subsequently be further processed according to given specifications.

The substance to be dispensed is contained for example in a source container which is equipped with a dispensing head. It is desirable to deliver the substance to the outside through a small outlet opening in the dosage-dispensing device, so that the substance can be filled in a targeted stream also into a container with an opening of narrow cross-section.

Dosage-dispensing devices for dry and/or powdery substances of a pourable consistency belong to the known state of the art and are in current use. For example in WO 2004/042334 A1, a dosage-dispensing device is described which includes a drive device and a dispensing head that can be set in place in the drive device. The dispensing head is connected to a source container and has a closable outlet at its underside. When the apparatus is in an operating position, a balance is arranged below the dispensing head, so that target containers can be set on the balance pan.

During the dosage-dispensing process, the substance to be dispensed is moved out of the source container and measured into the target container. The increase in weight which is measured continuously by the balance during the dosage-dispensing process is communicated to a control- and regulation unit, which stops the dispensing process as soon as the desired quantity of substance has been dispensed or when the substance quantity in the target container has reached the target weight as defined by the user.

The attainable precision of the dosage-dispensing device or, more specifically, the precision that can be attained in meeting the target weights within a tolerance band can be limited, because in dispensing processes of this kind the dosage-dispensing device has a tendency to deliver more than the prescribed quantity of substance. The reason for this is that at the time of reaching the target weight in the target container, additional substance has already left the dispensing head and is for example in free fall between the dosage-dispensing device and the target container, affecting the weighing result only after the additional substance is at rest on the bottom of the target container or on top of the previously dispensed substance.

The width of the tolerance band of the dosage-dispensing device, expressed by the scatter range of the achievable target weights is affected in particular by the response time of the balance. Due to the relatively late arrival of the weighing signal in the control- and regulation unit of the dosage-dispensing device, too much substance has already been dispensed in the meantime. In many dosage-dispensing devices which like the device disclosed in WO 2004/042334 A1 provide a continuous delivery of substance from the beginning to the end of the dosage-dispensing process, the mass flow or volume flow of the material to be dispensed is slowed down towards the end of the dosage-dispensing process by a dispensing program which is executed in the control- and regulation unit, in order to take the response time of the balance or of the electronic weighing system into account. However, as a result the dosage-dispensing process can take longer depending on the precision required so that for a specified narrow tolerance of the target weight or target quantity the dosage-dispensing process can take a very long time.

The dispensing program determines the variable degree to which an outlet opening at the dispensing head is opened and closed over the time of the dosage-dispensing process.

Unlike liquids, whose flow behavior remains approximately constant under given ambient conditions such as pressure and temperature, the flow properties of substances in powder- or paste form is affected by a considerably larger number of influence factors. The same powder can exhibit totally different flow behaviors simply due to different bulk densities. For example compressed wheat flour behaves in a fundamentally different way compared to loosely aggregated flour.

The flow properties of a substance in a dispensing process can also change strongly as a result of a change in the relative humidity of the ambient atmosphere or of the substance itself.

Also, particle size or grain size and the grain size distribution as well as the shape of the individual particles of a substance in a dosage-dispensing process can have a decisive influence on the flow behavior. All of these influence factors can make it nearly impossible to use one and the same dosage-dispensing program for the entire range of known powders with a uniform tolerance bandwidth.

SUMMARY

A dosage-dispensing process is disclosed which makes it possible to attain a high level of precision relative to an intended target weight within a reasonable completion time for a dosage-dispensing process. A dosage-dispensing device is also disclosed that is suitable for performing the dosage-dispensing process.

A method of optimizing the dosage-dispensing process of a dosage-dispensing device for substances in powder- or paste form is disclosed, wherein the dosage-dispensing device is equipped with a drive device with a control- and regulation unit for execution of a dosage-dispensing program, and the drive device cooperates with at least one dosage-dispensing unit for delivery of substance doses, wherein the dosage-dispensing unit comprises at least one memory module, the method comprising: examining via the control and regulation unit, prior to a first run of a dosage-dispensing process, whether at least one flow parameter relating to the dosage-dispensing process is stored in the memory module and/or in the control- and regulation unit; if a stored flow parameter is found to be present, calling up at least one flow parameter from the at least one memory module by the control- and regulation unit; if no stored flow parameter is present, receiving a flow parameter request entered by a user, calling up a flow parameter from a central database, or determining at least one flow parameter via the first run of the dosage-dispensing process based on a default setting of the dosage-dispensing program; adapting the dosage-dispensing program with the at least one flow parameter; and performing at least one run of the dosage-dispensing process with the adapted dosage-dispensing program, and/or storing the at least one flow parameter in the memory module.

A dosage-dispensing device is also disclosed, comprising: a drive device with a control- and regulation unit operable to execute a dosage-dispensing program, wherein the drive device is configured to be brought into a functional connection with at least one dosage-dispensing unit for delivery of a substance dose, wherein the dosage-dispensing unit includes at least one memory module, configured such that at least one flow parameter for use by the dosage dispensing program is called up from the memory module by the control- and regulation unit, and/or the flow parameter is stored in the memory module and/or in a database and/or in the control- and regulation unit.

BRIEF DESCRIPTION OF THE DRAWINGS

Details of the method according to the disclosure and of the dosage-dispensing device according to the disclosure are presented in the description of the embodiments illustrated in the drawings, wherein.

DETAILED DESCRIPTION

Figure 1:
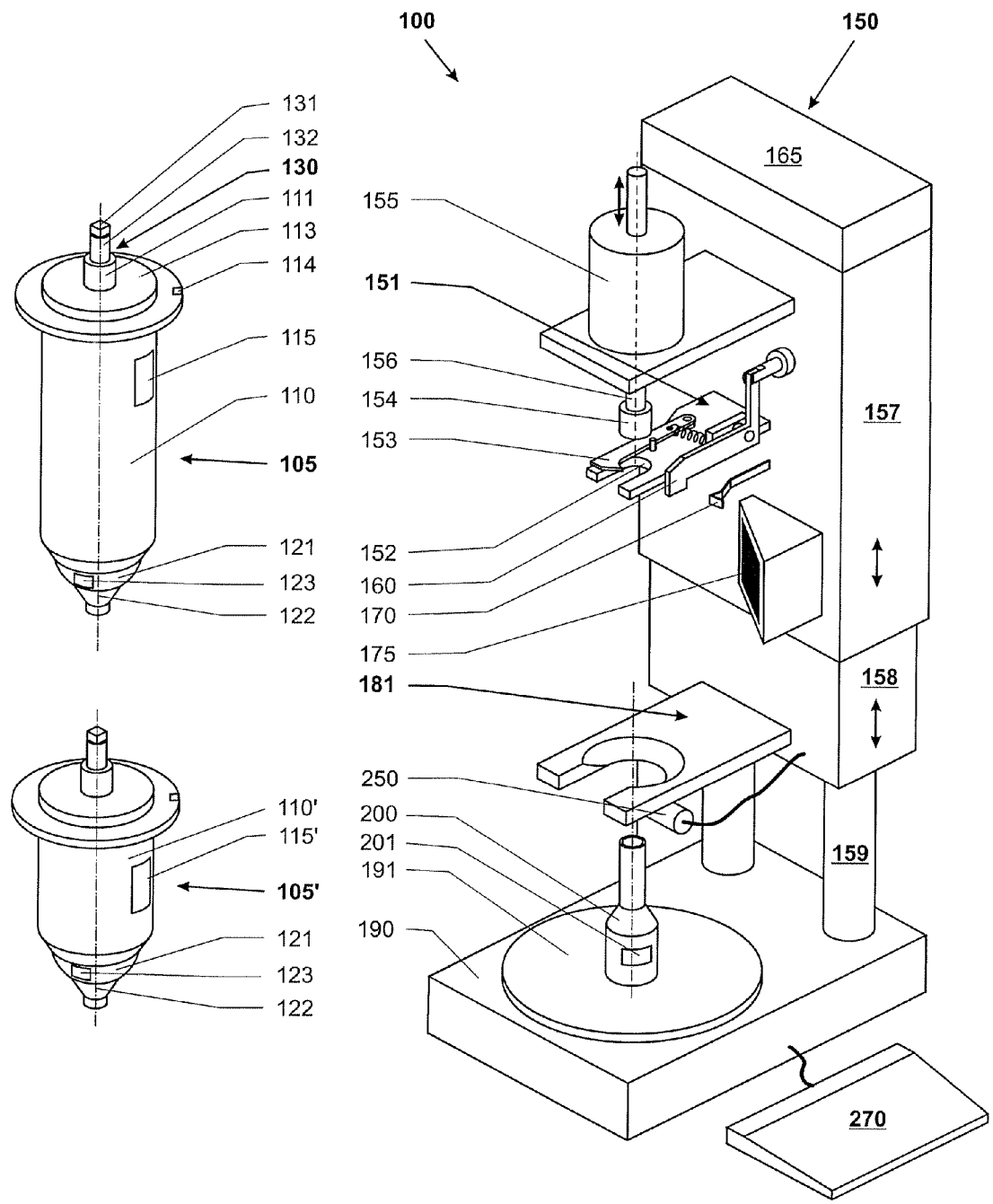
FIG. 1 represents an exemplary dosage-dispensing device with a drive device and two reservoir containers of different lengths and equipped with dispensing heads, wherein the dispensing heads are shown as separated from the drive device.

Exemplary embodiments disclosed herein are directed to optimization of a dosage-dispensing process, wherein a dosage-dispensing device is equipped with a drive device with a control- and regulation unit designed for the execution of a dosage-dispensing program, wherein the drive device cooperates with at least one dosage-dispensing unit for the delivery of a substance dose and the dosage-dispensing unit has at least one memory module.

In an exemplary process of optimizing the dosage-dispensing process of a dosage-dispensing device for substances in powder- or paste form:

prior to a first run of a dosage-dispensing process, the control- and regulation unit checks whether at least one flow parameter relating to the dosage-dispensing process is stored in the memory module and/or in the control- and regulation unit;

if a stored flow parameter is found to be present, at least one flow parameter is called up from the at least one memory module by the control- and regulation unit;

if no stored flow parameter is present, a flow parameter is requested by the user by entering a request, a flow parameter is called up from a central database, or at least one flow parameter is determined by the first run of the dosage-dispensing process based on a default setting of the dosage-dispensing program;

the dosage-dispensing program is directly adapted with the at least one flow parameter;

at least one run of the dosage-dispensing process is performed with the adapted dosage-dispensing program, and/or the at least one flow parameter is stored in the memory module.

After a flow parameter has been determined which, for example, depends essentially on the interior geometric arrangement of the dispensing head and on the properties of the powder to be dispensed, the dosage-dispensing program can be adapted in such a way that the opening and closing of the outlet opening can take place in a way where the properties of the substance to be dispensed are appropriately taken into account. An advantage of an exemplary method disclosed herein is that the flow parameter remains available for subsequent dosage deliveries and, by being stored in the memory module, remains connected to the dosage-dispensing unit that is filled with the substance to be dispensed. After a delivery of substance, the dosage unit can for example be returned to a storage location until a next delivery of a substance dose is needed. In this subsequent delivery, it is not necessary to first determine the flow parameter through a slow, time-consuming run of the dosage-dispensing process, as it can be called up directly from the memory module by the control- and regulating unit.

The dosage-dispensing unit includes in essence a dosage-dispensing head and at least one reservoir container which are connected to each other by, for example, a form-fitting, force-fitting, or materially bonded connection. The reservoir container as well as the dosage-dispensing head can have at least one memory module.

The at least one flow parameter can be determined essentially from the volume flow rate or mass flow rate delivered during the dosage-dispensing process from an outlet orifice formed on the dosage-dispensing unit or, more specifically, on the dispensing head and from the variable aperture cross-section of the outlet orifice.

Thus, the flow parameter is a quantity which in essence can predict the mass or volume flow rate that is to be expected depending on the aperture cross-section of the outlet orifice of the dosage-dispensing head. Thus, the flow parameter allows a prediction as to when the outlet orifice of the dispensing head needs to be closed for the specific substance in the dosage-dispensing process. In subsequent dosage deliveries, it is therefore not necessary to wait for the weight value from the balance, in order to slowly approach the given weight target. The measured weight value merely serves to confirm the amount of substance delivered and, if necessary, to adjust the flow parameter or the dosage-dispensing program if the delivered substance quantity is found to be close to the upper or lower tolerance limit of the target weight.

The flow parameter does not necessarily have to be an individual value; it can of course also have the form of a function or of a matrix of values.

Since the dispensing head and/or the reservoir container includes a memory module in which the flow parameter of the substance in the reservoir container is stored, this flow parameter is also available for further dosage deliveries without having to be determined first. If the flow parameter is stored in a central database, it can also be called up from the central database by such current communication means as the Internet. Such a central database can keep flow parameters available for the user which were determined for example by pretrial experiments.

To provide support to the user, a flow parameter that has been determined already at the factory through pretrial experiments can be stored in the memory module. This flow parameter found in pretrial experiments can have been determined with a reference substance whose powder flow properties are similar to the material that will later be filled into the dosage-dispensing unit. This can have the advantage that no highly toxic substances need to be used for the pretrial experiments.

Of course, the entry of the at least one flow parameter can also take place by way of an entry unit and/or an input/output unit.

In a first exemplary embodiment disclosed herein, at least one updated flow parameter is determined at least in the last of a series of dosage deliveries, and the at least one updated flow parameter is stored as a numerical value or a combination of numerical values or a function in the memory module and/or in the control- and regulation unit and/or in the central database and/or is delivered to the user through an input/output unit.

In a second exemplary embodiment, at least one updated flow parameter is determined after each dosage delivery, and the at least one updated flow parameter is stored as a numerical value or a combination of numerical values or a function in the memory module and/or in the control- and regulation unit and/or in the central database and/or is delivered to the user through an input/output unit.

Of course, the storing of the updated flow parameter can also occur after confirmation by the user. If the user declines the confirmation, the updated flow parameter is discarded.

After removing the dosage-delivery unit from the drive device, it is not necessarily required to separate the dispensing head from the reservoir container. Depending on the tightness of the dispensing head, the latter can serve at the same time as a closure lid, so that the reservoir container together with the dispensing head forms a storage container for the substance contained in it. To facilitate the administration of the storage containers, at least one substance identifier value for the substance contained in the reservoir container can be stored in the memory module and/or in the control and regulation unit and/or in the central database.

The influence factors mentioned in the introduction, which determine the flow behavior of substances in powder- or paste form, may make it difficult or impossible to achieve a satisfactory dosage delivery of diverse kinds of powders or pastes with the same dispensing head or the same model type of dispensing head. Therefore, while the mechanical connections to the drive device are of a uniform design, the mechanical components arranged in dispensing heads can be configured in different ways. As the flow behavior of the substance is also influenced by these components, it is advantageous if at least one technical characteristic value relating to the technical category or type of the dispensing head is stored in the memory module and/or in the control- and regulation unit and/or in the central database.

As the substance used for the dosage delivery can change during storage or, for substances that decay rapidly, even during a series of several consecutive dosage deliveries, it is advantageous if at least one substance property parameter, in particular the expiration date of the substance, is stored in the memory module and/or in the control- and regulation unit and/or in the central database. Further substance property parameters of the substance can include the particle size or grain size, the shape of the particles, the electrostatic properties, chemical properties and the like.

It is likewise advantageous if at least one ambient parameter of the ambient environment, in particular the humidity and/or the temperature and/or the ambient pressure are measured by means of at least one sensor and stored in the memory module and/or in the control- and regulation unit and/or in the central database.

The surfaces of the mechanical components of the dispensing head can be roughed up during the dosage-dispensing process for example under the influence of hard, sharp-edged substances used in the dosage delivery process. Such roughed-up surfaces can affect the flow behavior or, with continued dispensing activity, can even cause a contamination of the substance being dispensed if small particles break loose from roughed-up surface. At least one condition-related parameter characterizing the condition of the dispensing head, in particular the cumulative volume and/or number of deliveries, can be stored in the memory module and/or in the control- and regulation unit and/or in the central database.

In an exemplary embodiment, at least one flow parameter and/or an updated flow parameter and/or a substance property parameter and/or a condition-related parameter of the dispensing head and/or an ambient parameter of the ambient environment is stored together with at least one time information that indicates the time at which the respective parameter was measured and/or stored. Storing a parameter together with at least one time information opens up a number of possibilities for monitoring and evaluating. The time information data being stored can include for example the date and time of the dosage delivery, or the date and time when a characteristic when a characteristic parameter for the substance property, the condition of the dispensing head or the ambient environment was determined.

For example, if several values of a flow parameter are stored in chronological order, it is possible to determine if a change occurred. This change can provide information about the condition of the dispensing head and/or the substance being used in the dispensing process. An example of such an analysis will hereinafter be described.

If it is known from pretrial experiments how the flow parameter changes over the operating life of the dispensing head or over the storage time of the substance in the dosage-dispensing unit, there is no compelling need to determine an updated flow parameter. One can for example adjust the flow parameters by using correction values that were determined in the pretrial experiments.

Thus, accordingly:
the time information associated with the at least one flow parameter can be compared in the control- and regulation unit or in a separate processor unit to the time information associated with the last determined substance property parameter and/or the at least one condition-related parameter and/or the at least one ambient parameter;
if the time information associated with the flow parameter is older than the time information associated with the last determined substance property parameter and/or the at least one condition-related parameter and/or the at least one ambient parameter, pertinent correction values that were determined in pretrial experiments and are stored in the memory module and/or in the control- and regulation unit and/or in the central database can be called up, and an updated flow parameter can be determined based on said at least one flow parameter and taking the correction values into account by means of a correction program that is executable in the control- and regulation unit or in a separate processor unit; and the time information associated with the last determined substance property parameter, condition-related parameter or ambient parameter can be attached to the updated flow parameter; or if the time information associated with the flow parameter is more recent than the time information associated with the last determined substance property parameter and/or the at least one condition-related parameter and/or the at least one ambient parameter, at least one substance property parameter and/or a condition-related parameter and/or an ambient parameter can be determined.

Furthermore, the dosage-dispensing unit, in particular the dispensing head and/or the substance used for dispensing can be monitored by comparing the at least one flow parameter and/or the at least one updated flow parameter and/or at least one substance property parameter and/or at least one condition-related parameter and/or at least one ambient parameter in the control- and regulation unit or in a separate processor unit to at least one threshold value and, if the threshold value is found to be exceeded, by accordingly registering a wear exposure, by accordingly registering a wear exposure and calculating the cumulative sum of all wear exposures, or by accordingly registering a wear exposure and calculating the cumulative sum of all wear exposures, and by calculating through a comparison to a maximum value of the permissible wear exposure a permissible remaining wear exposure capacity or remaining life time of the dispensing head and/or of the substance used for dispensing.

As wear exposures are counted all changes that have a lasting effect on the dosage-dispensing process. For example, over the operating time of the dispensing head, the surfaces that are in contact with the substance being dispensed can become roughed up by the latter, whereby the flow behavior can be changed.

Also counted as wear exposures are effects that cause a lasting change of the substance being dispensed. For example, as a result of roughed-up surfaces of the dispensing head, individual particles can attach themselves to the surfaces and be ground up by other particles that move over them. Of course a change of the humidity or temperature of the ambient environment can also cause a change in the substance used for dispensing.

The exceeding of a threshold value and/or the exceeding of the maximum value can trigger different actions. For example, the control- and regulation unit or the processor unit can initiate an alarm and/or interrupt the dispensing process and/or turn off a signal indicating that the equipment is fit for operation.

Of course, the measured wear exposures, for example as a function of time or having a time information attached to them, can also be stored in the memory module and/or in the control- and regulation unit and/or in the central data base, even if no threshold value or maximum value has been exceeded. This opens up many new possibilities for documenting the condition of the individual samples and to possibly tailor further actions such as subsequent treatments of the dispensed substance based on these data. Also for the error analysis in case of failed experiments, these data can contribute important information.

By way of a read/write device, the data stored in the memory unit of the dispensing head can be used in many ways as desired by the user. If a target container carries a target container memory unit, at least one substance identifier value and/or at least one substance property parameter of the substance to be dispensed into or contained in the target container can be stored in this target container memory automatically or in response to an entry confirmation by the user. Thus, the substance dispensed into the target container can be unequivocally identified. As an additional substance characteristic, it is also possible to store the amount of substance dispensed into the container. This facilitates in particular the traceability and surveillance of substances that are subject to strict legal requirements.

To perform the process, it is necessary to have a suitable dosage-dispensing device. The dosage-dispensing device can have a drive device with a control- and regulation unit serving to execute a dosage-dispensing program. The drive device can be coupled with at least one dosage-dispensing unit as a working combination for the purpose of delivering measured doses of substance. The dosage-dispensing unit can include at least one memory module, and at least one flow parameter can be called up from the memory module by the control- and regulation unit, and/or a flow parameter can be stored in the memory module and/or in a database and/or in the control- and regulation unit.

The dosage-dispensing unit can be set up as a free-standing unit, or it can for example be set into a holder, from which it can be removed again after the dispensing process. The drive device can be set up in such a way in relation to the dosage-dispensing unit or in relation to the holder that the drive device is enabled to cooperate with the dosage-dispensing unit. For example, the drive device itself is equipped with means to receive at least one dosage-dispensing unit. Such receiving means can for example be a first and a second counterpart element which are shaped to conform to specially shaped parts of the dosage-dispensing element, for example a first and a second form-fitting element. The drive device is thereby coupled to the dosage-dispensing unit through a form-fitting connection, so that the drive device and the dosage-dispensing device cannot shift their positions independently of each other during operation of the dosage-dispensing device.

The dosage-dispensing unit can be composed substantially of a reservoir container and a dispensing head which are coupled to each other through a form-fitting, force-fitting, or materially bonded connection.

At least one parameter characterizing a substance property parameter of the substance being dispensed and/or at least one condition-related parameter characterizing the condition of the dispensing head and/or at least one ambient parameter of the ambient environment can be stored in or called up from the memory module.

The memory module can be connected to the control- and regulation unit through at least one galvanic connection and/or by way of a wireless connection.

A target container that is to be filled by the dosage-dispensing device includes, for example, a target container memory unit. In this target container memory unit, at least one substance identifier value and/or at least one substance property parameter of the substance to be dispensed into or contained in the target container can be stored either automatically by the control- and regulation unit and/or after an input confirmation and/or an entry by the user through an entry unit, and the contents of the target container memory unit can be read by way of at least one read/write device.

The at least one flow parameter or updated flow parameter represents substantially the ratio of the volume flow or mass flow of the substance being dispensed during the dispensing process through an outlet orifice formed on the dosage-dispensing unit or the dispensing head in relation to a variable aperture cross-section of the outlet orifice.

FIG. 1 shows an exemplary dosage-dispensing device 100 which includes a drive device 150 with dosage-dispensing units 105, 105' that can be set into and removed from the drive device 150. The dosage unit 105, 105' has a dispensing head 122 and reservoir containers 110, 110'. The drive device 150 has an upper part 157 and a lower part 158 which in the operating position of the dosage-dispensing device 100 are movable substantially in a straight vertical line away from each other as well as towards each other. This makes it possible to use reservoir containers 110, 110' of different lengths. To ensure a simple exchange of the dosage-dispensing unit 105, 105' and a safe and precise dispensing operation, the dosage-dispensing unit 105, 105' and the drive device 150 can have suitable mechanical coupling elements, or in some cases mechanical and electrical coupling elements, with matching shapes for a form-fitting connection. The dosage-dispensing unit 105, 105' has at least one first form-fitting element 111, whose position in a horizontal plane relative to the operating position of the dosage-dispensing device 100 is secured by a first counterpart element 151 which is formed on the upper part 157. The dosage-dispensing device 105, 105' further has at least one second form-fitting element 121, whose spatial position relative to the drive device 150 is secured by a second counterpart element 181 which is formed on or connected to the lower part 158. As a result, the dosage-dispensing unit 105, 105', specifically its outlet orifice for the substance being dispensed, is precisely aligned in relation to a target container 200. Arranged on the second counterpart element 181 is a humidity sensor 250, whereby the humidity in the immediate vicinity of the fill opening of the target container 200 can be continuously monitored. The dosage-dispensing device 100 is connected to an input/output device 270, through which for example the target weight and the desired tolerance of the target weight can be entered and which displays an indication when the dispensing process is completed. In addition, a variety of data can be called up from or entered into the input/output unit 270. Furthermore, a control- and regulation unit 165 of the dosage-dispensing device 100 can generate different messages and warnings and present them to the user through the input/output device 270.

The reservoir container 110 in FIG. 1 is of a basically cylindrical shape. However, reservoir containers with other shapes are also possible, for example with a quadratic, hexagonal or octagonal exterior or interior cross-section. When the dispensing head 122 with the reservoir container 110, 110' is set in place in the drive device 150, its longitudinal axis in the operating condition is oriented vertically, with the dispensing head 122 being located at the bottom end of the reservoir container 110, 110'. Integrated in the dispensing head 122 is a closure valve body (not shown) which can be moved by a rotary drive and is connected to a closure shaft 132 that is movably constrained in the reservoir container 110. The body of the reservoir container 110 is configured in a tubular shape and is closed off at the top by a cover 113. The cover 113 contains a passage 130 with a rotary bearing constraining the closure shaft 132 at its opposite end from the closure valve body and letting the end of the shaft protrude from the reservoir container 110. The protruding end of the closure shaft 132 carries a coupler part 131 which in this embodiment is configured as a square bolt which at least during the dispensing process is connected through a coupler sleeve 154 to the drive source 155 that is integrated in the drive device 150. For the engagement and disengagement of the coupler pieces, the drive source 155 or at least a drive shaft 156 connected to the drive source should, for example, be capable of linear vertical displacement in relation to the operating position. Of course, instead of the square bolt one could use any state-of-the-art coupling connectors whose mating halves are separable from each other in a simple manner.

Figure 2:
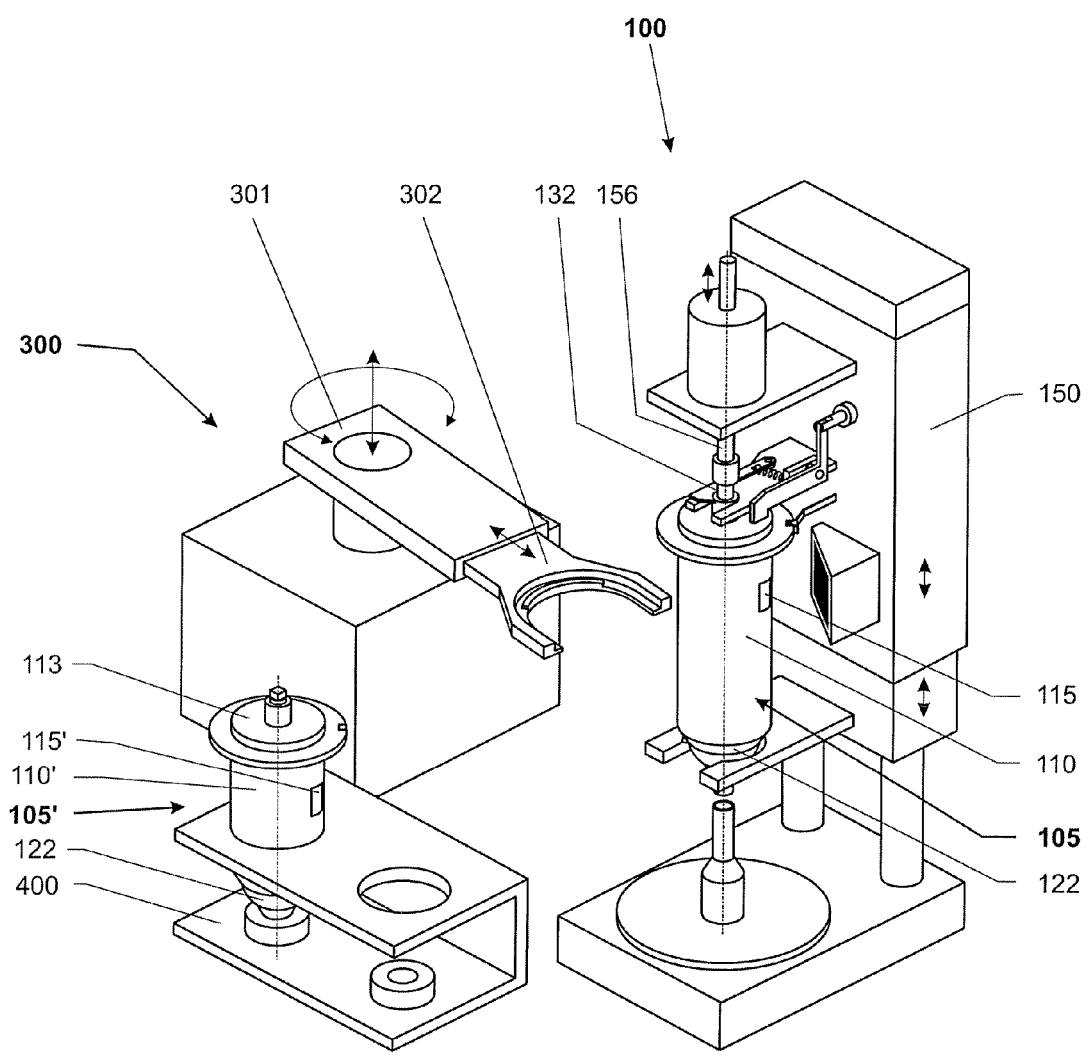
FIG. 2 represents the dosage-dispensing device of FIG. 1, with a dosage-dispensing unit set in place in the drive device, as well as a handling device and a multi-unit storage rack in which a second dosage-dispensing unit is stored in a standing position.

To prevent the first form-fitting element 111 from slipping out of the first counterpart element 151, a spring-biased retaining latch 153 pushes the form-fitting element 111 against the bottom 152 of the seating slot when the dosage-dispensing unit 105, 105' is seated in place. To remove the dosage-dispensing unit 105, 105' from the drive device 150, the retaining latch 153 can be opened electromechanically or pneumatically. As shown in FIG. 1 and FIG. 2, if the nose of the latch is given a suitable shape, the retaining latch 153 can be pushed aside by the form-fitting element 111 by applying a considerable amount of force when removing the dosage-dispensing unit 105, 105'. The spring-biased retaining latch 153 and/or the bottom 152 of the slot can in addition carry electrical contact terminals which in the installed state of the dosage-dispensing unit 105, 105' are in touch with corresponding counterpart contacts on the first form-fitting element 111 or on the reservoir container 110, whereby an electrical connection is established between the dosage-dispensing unit 105, 105' and the drive device 150. Such a connection can be used for electrically grounding the dosage-dispensing unit 105, 105' or, as described in the following, also for connecting to a memory module 115, 115', 123 that is arranged in or on the dosage-dispensing unit 105, 105'. This memory module 115, 115', 123 can serve to store the flow parameter and in addition also the length of the reservoir container 110, 110', so that the drive device 150 can adapt itself automatically to the different lengths of the reservoir containers 110, 110'.

The drive device 150 further includes a locking device 160 which, when the dosage-dispensing unit 105, 105' is seated in place, acts on the cover 113 as shown in FIG. 2 and secures the dosage-dispensing unit 105, 105' against dislocation in the vertical direction. The locking device 160, too, can have additional contacts and electrical connections to the memory module 115, 115', 123 and can be actuated mechanically, electromechanically or pneumatically as has already been described for the retaining latch 153.

Furthermore, a notch 114 is formed on the cover 113. In the installed condition of the dosage-dispensing unit 105, 105', this notch 114 is engaged by a rotation-blocking safety element 170, which serves to absorb and counteract the torque applied to the dosage-dispensing unit 105, 105' by the drive source 155. In the illustrated embodiment, the rotation-blocking safety element 170 is configured as a simple spring-biased tongue, so that in setting the dosage-dispensing unit 105, 105' in place, no attention needs to be paid to the position of the notch 114 in relation to the safety element 170. As soon as the drive source 155 is connected by way of a drive shaft 156 to the closure shaft 132 and a torque is acting on the closure shaft 132, the dosage-dispensing unit 105, 105' is taken along by the rotation until the safety element 170 snaps into engagement. Of course, the dosage-dispensing unit 105, 105' can also be turned manually into the locked position. As a rotation-blocking safety element 170, one can use not only spring-biased tongues but also bolts, pins, clamping calipers and the like. The rotation-blocking safety element 170, too, can carry an electrical connection to the memory module 115, 115', 123, as has already been described for the retaining latch 153. In addition, the rotation-blocking safety element 170 acts at the same time as an overload protection device for the drive source, in case the movement of the closure shaft 132 in the dosage-dispensing unit 105, 105' is blocked. Of course, the notch 114 can be formed at any desired location of the dosage-dispensing unit 105, 105', and the rotation-blocking safety element 170 can be arranged accordingly at a matching location of the drive device 150.

However, there is no compelling need for the memory module 115, 115', 123 to be connected to the control- and regulation unit 165 of the dosage-dispensing device 100 through electrical conductors such as a signal cable, a bus system or the like. It is also possible to use wireless connections, for example a read/write device 175 that works inductively or through radio waves. For example, RFID technology is suitable for this application.

As a means for measuring appropriate control- and regulation variables for the control and regulation of the dosage-dispensing process, the drive device 150 is connected mechanically through height-adjustable feet 159 and through an electrical connection (not shown) preferably to a force-measuring device 190 on whose load receiver 191 the target container 200 is placed. Of course, the force-measuring device 190 can also be arranged as a mechanically separate unit from the drive device 150. The separate arrangement can prevent vibrations of the drive device 150 being transmitted to the force-measuring device 190 during the dispensing process with a detrimental effect on the weighing signal and/or the response time of the force-measuring device 190. The target container 200 can carry a target container memory module 201 in which property parameters of the substance used for dispensing, such as grain size, expiration date or flow parameter can be stored by way of, for example, a wireless connection, including for example the read/write device 175. Due to the height-adjustable feet 159 it is possible to use target containers 200 of different shapes and sizes with different container heights.

FIG. 2 shows the dosage-dispensing device of FIG. 1, a handling device 300 for dispensing heads 122 with reservoir containers 110, 110' and a multi-unit storage rack 400. The multi-unit storage rack 400 can be incorporated in the handling device 300 or also arranged separately from the latter, as shown in FIG. 2. A dosage unit 105, 105' is seated in the drive device 150 of the dosage-dispensing device 100. The drive shaft 156 is coupled to the closure shaft 132. To allow coupling and uncoupling, the drive shaft 156 needs to be vertically movable in relation to the operating position of the apparatus. The dispensing head 122 tightly closes the reservoir container 110, 110', so that this dosage-dispensing unit 105, 105' can be used as storage container and stored in the multi-unit storage rack 400 standing next to the drive device.

The schematically illustrated handling device 300 has a handling arm 301 which, when in the operating position, can swivel in a horizontal plane. In addition, the handling arm 301 is capable of linear vertical movement. Its fork-shaped gripper 302 can be moved in and out in the direction of the longitudinal axis of the handling arm 301. By means of the handling arm 301 and its gripper 302 which takes hold of the cover 113, a unit consisting of a dispensing head 122 and a reservoir container 110, 110' can be set into as well as removed from the drive device 150.

Figure 3:
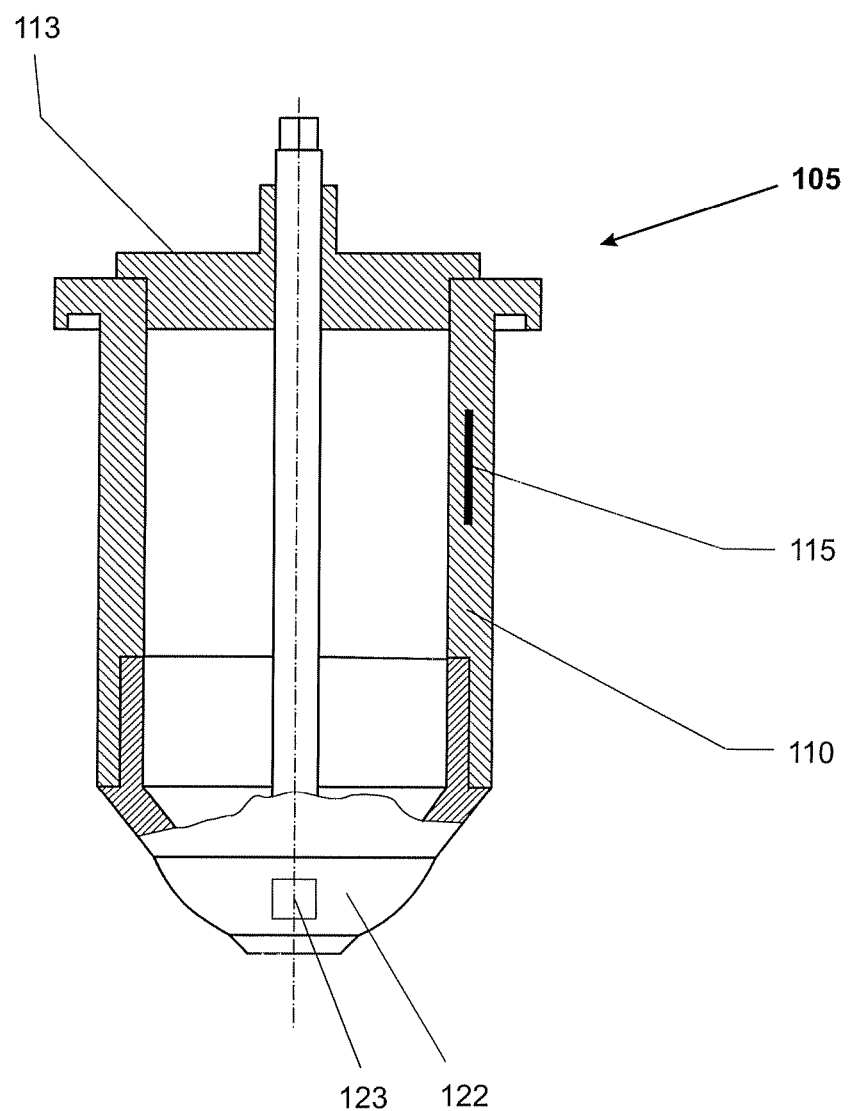
FIG. 3 illustrates an exemplary dosage-dispensing unit in a partially sectional view, showing a possibility for arranging a memory unit on the dispensing head, as well as a memory unit on the reservoir container.

FIG. 3 represents a dosage-dispensing unit 105, 105' shown partially in sectional view, which includes a dispensing head 122 and a reservoir container 110. As can be seen, the dispensing head 122 is connected for example by way of a screw thread with the reservoir container 110. The reservoir container 110 includes a memory module 115, and the dispensing head 122 includes a memory module 123. Thus, data that are specific to the dispensing head can be stored in the memory module 123 of the dispensing head 122, while data that are specific to the substance used for dispensing are stored in the memory module 115 of the reservoir container 110. After the dispensing head 122 has been assembled with the reservoir container 110 and the assembled dosage-dispensing unit 105, 105' has been seated in the drive device the data from the two memory modules 115, 123 can be read by the read-write device and entered into the control- and regulation unit. The data can be processed in a processor of the control- and regulation unit, and the program can be adapted accordingly.

Of course, any solution in which the reservoir container 110 and the cover 113 are monolithically connected to each other is likewise possible. Of course, it is also possible that there is only one memory module for each dosage-dispensing unit 105.

As has already been described above, different wear factors such as the cumulative operating time, the temperature, the ambient humidity and the like can have an effect on the dosage-dispensing unit and the substance used for dispensing and can over time effect a critical change of the flow parameter and thus on the scatter range of the quantities being dispensed in relation to the given target quantity. FIG. 4 shows an example that is representative for the different possible forms of wear and how they can be taken into account in the dispensing process or in the operation of the dosage-dispensing device. As an example, FIG. 4 shows the time profile of the relative humidity which was obtained from the continuously registered sensor signals $S_{HS}$ of the humidity sensor 250 of FIG. 1. FIG. 4 furthermore also shows the output signals or output messages $A_C$, $A_M$, $A_D$ generated for example by the processor of the control- and regulation unit.

Figure 4A:
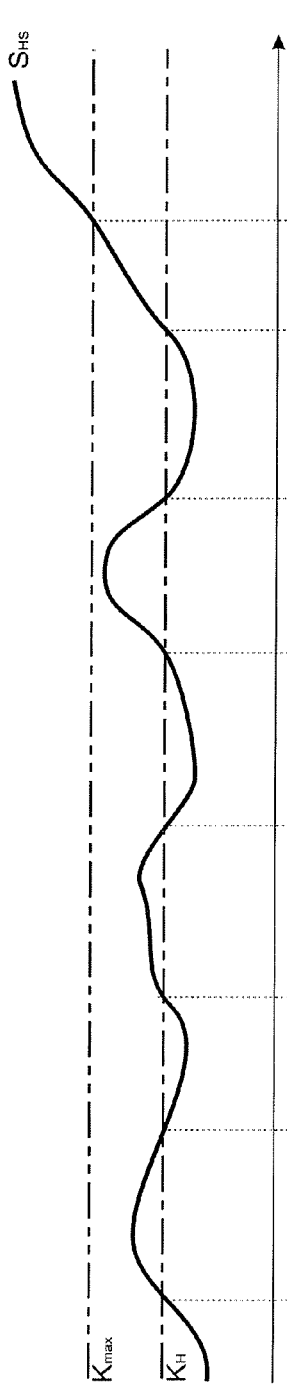
FIG. 4 shows an exemplary time profile of a signal of a humidity sensor that is arranged on the dosage-dispensing device, wherein the diagram 4a shows a signal profile, diagram 4b shows a cumulative wear exposure, and diagram 4c shows output signals or output messages generated by the signal profile.

In FIG. 4a the sensor signal graph crosses above a threshold value $K_H$ at the times $t_1$, $t_3$, $t_5$, $t_8$. This threshold value represents the limit above which the moisture content of the substance used for dispensing reaches the point where the flow behavior of the substance changes because of a tendency of the substance to stick together in lumps. The magnitude of the threshold value $K_H$ depends on the mechanical properties of the substance used for dispensing and needs to be determined through pretrial experiments on a case-by-case basis. For example the following values can be defined as threshold values:

max/min moisture content
    max/min temperature limits
    maximum cumulative operating time (mechanical wear effects caused by the substance being dispensed)

As soon as the graph passes below the threshold value $K_H$, as is the case at the times $t_2$, $t_4$, $t_7$, the tendency of the substance to form lumps disappears. The change of the flow parameter during these time segments is possibly of negligible magnitude.

However, as a result of the change in the ambient humidity, the substance could dry out while flowing into the target container, and its properties, for example its ability to enter into reactions, could be changed. This, too, can be monitored and, as shown in FIG. 4c, a warning $A_C$ can be delivered by way of an output device when the signal falls below the threshold value $K_H$.

Furthermore, a maximum value $K_{max}$ can be defined so that when the signal rises above $K_{max}$, the flow parameter has changed to an extent where it is no longer possible to dispense measured doses of the substance or where the properties of the substance used for the dispensing have changed to an extent that renders the substance unusable. In such a case, the dosage-dispensing process could for example be entirely stopped as shown in FIG. 4c, or a request $A_D$ to change the dispensing head or the entire dosage-dispensing unit could be signaled to the user by way of the input/output unit shown in FIG. 1.

The change of the flow parameter can likewise be monitored and analyzed in a comparable manner.

The instances where the threshold value $K_H$ and the maximum value $K_{max}$ are exceeded, as a function of the lengths of the respective time intervals ($t_2$-$t_1$; $t_4$-$t_3$; $t_7$-$t_5$; ... ) are registered as wear exposures $INT_{LTH}$ and added up as a cumulative sum. The accumulated wear exposures $INT_{LTH}$ are compared to the lifetime limit value $MAX_{LTH}$ and based on this comparison the remaining operating life $R_{LTH1}$, $R_{LTH2}$, $R_{LTH3}$ is calculated. The latter is transmitted to the output unit 270, and stored in the memory module, in the control- and regulation unit or in a central database (not shown in the drawing).

Figure 4B:
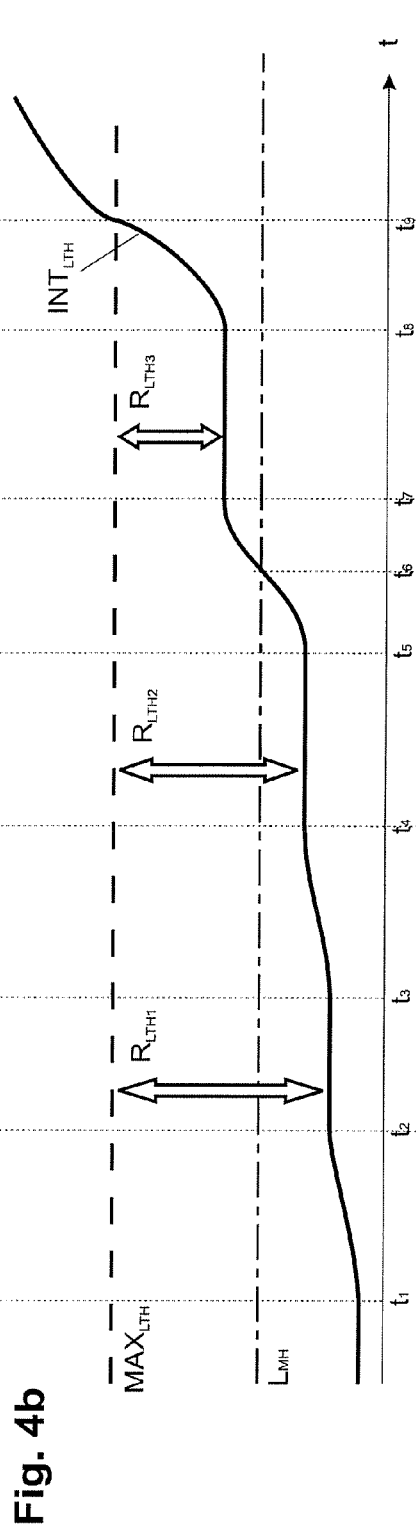
Figure 4C:
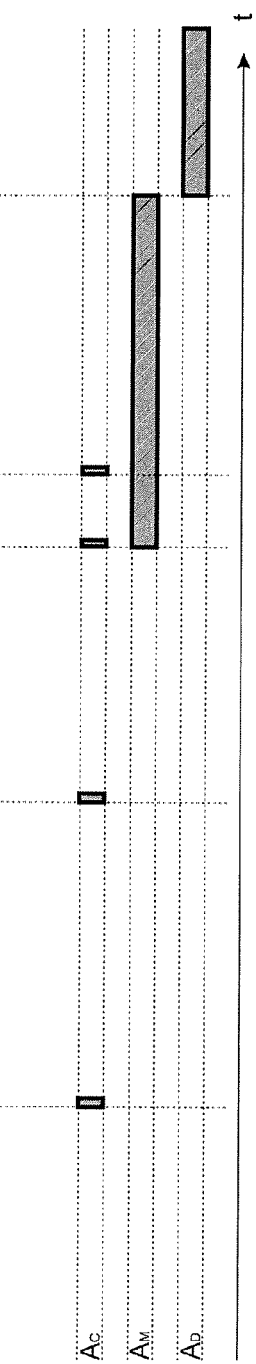

As illustrated in FIG. 4b, it is possible to define additional limit values. As an example, one could name the servicing limit value $L_{MH}$ which, when exceeded, causes a warning message and/or a servicing request $A_M$ to be transmitted to the input/output unit 270 (FIG. 4c). This can mean for example that the dispensing head needs to be exchanged. Furthermore, exceeding the servicing limit value $L_{MH}$ at the time $T_6$ can for example cause the dispensing process to be canceled, the tolerance bandwidth of the target weight to be downgraded and/or printouts of measurement values can be provided with warning messages. This enumeration is not meant to be complete, as many other responses and types of outputs are possible.

As soon as the cumulative wear exposures $INT_{LTH}$ exceed the lifetime limit value $MAX_{LTH}$ a corresponding signal value $A_D$, as shown in FIG. 4c, can be transmitted to the input/output unit 270 and the dispensing process can for example be cancelled entirely, and a request $A_D$ can be signaled to the user through the input/output unit 270 to change the dispensing head or the entire unit of dispensing head and reservoir container.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

- 100 dosage-dispensing device
- 105, 105' dosage-dispensing unit
- 110, 110' reservoir container
- 111 first form-fitting element
- 113 cover
- 114 notch
- 115, 115' memory module
- 121 second form-fitting element
- 122 dispensing head
- 123 memory module
- 130 passage
- 131 coupler part
- 132 closure shaft
- 150 drive device
- 151 first counterpart element
- 152 bottom of slot
- 153 retaining latch
- 154 coupler sleeve
- 155 drive source
- 156 drive shaft
- 157 upper part
- 158 lower part
- 159 foot
- 160 locking device
- 165 control- and regulation unit
- 170 rotation-blocking safety element
- 175 read/write device
- 181 second counterpart element
- 190 force-measuring device
- 191 load-receiver
- 200 target container
- 201 target container memory unit
- 250 humidity sensor
- 270 input/output device
- 300 handling device
- 301 handling arm
- 302 gripper
- 400 multi-unit storage rack

What is claimed is:

1. A method of optimizing the dosage-dispensing process of a dosage-dispensing device for substances in powder- or paste form, wherein the dosage-dispensing device is equipped with a drive device and a force measuring device, the drive device having a control- and regulation unit for execution of a dosage-dispensing program, and the drive device cooperates with at least one dosage-dispensing unit for delivery of substance doses, wherein the dosage-dispensing unit comprises at least one memory module, the method comprising:

examining via the control and regulation unit, prior to a first run of a dosage-dispensing process for a first substance, whether at least one flow parameter relating to the dosage-dispensing process for the first substance is stored in the memory module and/or in the control- and regulation unit;

if no stored flow parameter for the first substance is present, determining at least one flow parameter for the first substance via the first run of the dosage-dispensing process for the first substance based on a default setting of the dosage-dispensing program, wherein the default setting includes at least one flow parameter of a reference substance;

adapting the dosage-dispensing program with the at least one flow parameter of the reference substance; and performing at least one run of the dosage-dispensing process with the adapted dosage-dispensing program, wherein the control- and regulation unit receives a weighing signal from the force measuring device, determines the at least one flow parameter of the first substance from the weighing signal and other values obtained during the first run, and stores the at least one determined flow parameter of the first substance.

2. The method according to claim 1, comprising:
determining the at least one flow parameter based on a volume flow rate or mass flow rate delivered during the dosage-dispensing process from an outlet orifice on the dosage-dispensing unit and based on an aperture cross-section of a variable outlet orifice.

3. The method according to claim 1, comprising:
storing a flow parameter determined by pretrial experiments at a factory in the at least one memory module.

4. The method according to claim 1, comprising:
entering the at least one flow parameter by way of an input/output unit.

5. A method of optimizing the dosage-dispensing process of a dosage-dispensing device for substances in powder- or paste form, wherein the dosage-dispensing device is equipped with a drive device device and a force measuring device, the drive device having a control- and regulation unit for execution of a dosage-dispensing program, and the drive device cooperates with at least one dosage-dispensing unit for delivery of substance doses, wherein the dosage-dispensing unit comprises at least one memory module, the method comprising:

examining via the control and regulation unit, prior to a first run of a dosage-dispensing process for a first substance, whether at least one flow parameter relating to the dosage-dispensing process for the first substance is stored in the memory module and/or in the control- and regulation unit;

if no stored flow parameter for the first substance is present, determining at least one flow parameter via the first run of the dosage-dispensing process for the first substance based on a default setting of the dosage-dispensing wherein, the default setting includes at least one flow parameter of a reference substance;

adapting the dosage-dispensing program with the at least one flow parameter of the reference substance;

performing at least one run of the dosage-dispensing process with the adapted dosage-dispensing program, wherein the control- and regulation unit receives a weighing signal from the force measuring device, determines the at least one flow parameter for the first substance from the weighing signal and other values obtained during the first run, and stores the at least one determined flow parameter for the first substance in the memory module;

determining at least one updated flow parameter for the first substance in a last run of a series of runs of the dosage-dispensing process; and storing the at least one updated flow parameter for the first substance as a numerical value or a combination of numerical values or a function in the memory module and/or in the control- and regulation unit and/or in the central database and/or delivering the at least one updated flow parameter for the first substance to the user through an input/output unit.

6. The method according to claim 1, comprising:

determining at least one updated flow parameter after each run of the dosage-dispensing process for the first substance, and storing the at least one updated flow parameter as a numerical value or a combination of numerical values or a function in the memory module and/or in the control- and regulation unit and/or in the central database and/or delivering the at least one updated flow parameter to the user through an input/output unit.

7. The method according to claim 5, wherein the storing takes place only in response to an action by the user.

8. The method according to claim 1, comprising:

storing at least one substance identifier value for the substance contained in the reservoir container in the memory module and/or in the control and regulation unit and/or in the central database.

9. The method according to claim 1, comprising:

storing at least one technical characteristic value related to the technical type of the dispensing head in the memory module and/or in the control- and regulation unit and/or in the central database.

10. The method according to claim 1, comprising:

storing at least one substance property parameter, including an expiration date of a substance used for dispensing, in the memory module and/or in the control- and regulation unit and/or in the central database.

11. The method according to claim 1, comprising:

measuring at least one ambient parameter of the ambient environment, including humidity and/or temperature and/or ambient pressure using at least one sensor, and storing the parameter in the memory module and/or in the control- and regulation unit and/or in the central database.

12. The method according to claim 1, comprising:

storing at least one condition-related parameter characterizing a condition of the dispensing head, including a cumulative volume of dispensed material and/or a number of deliveries, in the memory module and/or in the control- and regulation unit and/or in the central database.

13. The method according to claim 1, comprising:

storing at least one flow parameter for the first substance and/or an updated flow parameter for the first substance and/or a substance property parameter for the first substance and/or at least one condition-related parameter of the dispensing head and/or at least one ambient parameter of the ambient environment together with at least one time information that indicates a time and/or date at which the respective parameter was measured and/or stored.

14. A method according to claim 13, comprising:

comparing time information associated with the at least one flow parameter for the first substance in the control- and regulation unit or in a separate processor unit to time information associated with a last determined substance property parameter for the first substance and/or the at least one condition-related parameter and/or the at least one ambient parameter;

calling up, if the time information associated with the flow parameter is older than the time information associated with the last determined substance property parameter and/or the at least one condition-related parameter and/or the at least one ambient parameter, pertinent correction values that were determined in pretrial experiments and are stored in the memory module and/or in the control- and regulation unit and/or in the central database, and determining an updated flow parameter for the first substance based on said at least one flow parameter for the first substance and taking the correction values into account using a correction program that is executable in the control- and regulation unit or in a separate processor unit; and attaching the time information associated with the last determined substance property parameter, condition-related parameter or ambient parameter to the updated flow parameter for the first substance; or determining, if the time information associated with the flow parameter is more recent than the time information associated with the last determined substance property parameter and/or the at least one condition-related parameter and/or the at least one ambient parameter, at least one substance property parameter and/or a condition-related parameter and/or an ambient parameter.

15. The method according to claim 13, comprising:

comparing the at least one flow parameter for the first substance and/or the at least one updated flow parameter for the first substance and/or at least one substance property parameter for the first substance and/or at least one condition-related parameter and/or at least one ambient parameter in the control- and regulation unit or in a separate processor unit to at least one threshold value ($K_H$) and, if the threshold value ($K_H$) is found to be exceeded, a wear exposure is registered accordingly, a wear exposure is registered accordingly and a cumulative sum ($INT_{LTH}$) of all wear exposures is calculated, or a wear exposure is registered accordingly and the cumulative sum ($INT_{LTH}$) of all wear exposures is calculated, and a permissible remaining wear exposure or remaining life time ($R_{LTH}$) of the dispensing head and/or of the substance used for dispensing is calculated by way of a comparison to a maximum value ($MAX_{LTH}$).

16. The method according to claim 15, comprising:

after the threshold value ($K_H$) has been exceeded and/or after the maximum value ($K_{max}$) has been exceeded, initiating via the control- and regulating unit or the processor unit an alarm and/or breaking off the dispensing process and/or turning off a signal indicating that equipment is fit for operation.

17. The method according to claim 1, wherein a target container that is to be filled by the dosage-dispensing device comprises a target container memory unit in which at least one substance identifier value and/or at least one substance property parameter of the substance to be dispensed into or contained in the target container is stored automatically or in response to an entry confirmation by the user.

18. A dosage-dispensing device, comprising:

a drive device with a control- and regulation unit operable to execute a dosage-dispensing program; and a force measuring unit that generates a weighing signal based on a weight of a target container, which receives the dispensed dosage, wherein the drive device is configured to be brought into a functional connection with at least one dosage-dispensing unit for delivery of a substance dose to the target container, wherein the dosage-dispensing unit includes at least one memory module, configured such that the control and regulation unit determines whether at least one flow parameter for a first substance for use by the dosage dispensing program is stored in at least one of the memory module, a database, and the control- and regulation unit, wherein if no flow parameter for the first substance is stored, the control- and regulation unit is configured to determine the at least one flow parameter for the first substance via the first run of the dosage-dispensing process for the first substance based on a default setting of the dosage-dispensing program, wherein the default setting includes at least one flow parameter of a reference substance and wherein during the first run the control- and regulation unit receives the weighing signal from the force measuring unit, determines the at least one flow parameter for the first substance from the weighing signal and other values obtained during the first run, and stores the at least one determined flow parameter.

19. The dosage-dispensing device according to claim 18, wherein the drive device comprises:

receiving means to accommodate at least one dosage unit.

20. The dosage-dispensing device according to claim 18, wherein at least one substance property parameter characterizing a substance property and/or at least one condition-related parameter characterizing the condition of the dispensing head and/or at least one ambient parameter of the ambient environment can be stored in or called up from the memory module and/or the control- and regulation unit and/or a central database.

21. The dosage-dispensing device according to claim 18, wherein the memory module is connected to the control- and regulation unit through at least one galvanic connection and/or by way of at least one wireless connection.

22. The dosage-dispensing device according to claim 18, wherein a target container that is to be filled by the dosage-dispensing device comprises a target container memory unit in which at least one substance identifier value stored in the memory module and/or in the control- and regulation unit and/or in a central database and/or at least one substance property parameter of the substance to be dispensed into or contained in the target container is stored either automatically and/or after an input confirmation and/or an entry by the user, and the target container memory unit is configured to be read by way of at least one read/write device.

23. The dosage-dispensing device according to claim 18, wherein the at least one flow parameter for the first substance represents a ratio of the volume flow or mass flow of the substance being dispensed during the dispensing process through an outlet orifice on the dosage-dispensing unit in relation to an aperture cross-section of the outlet orifice.

24. The method according to claim 2, comprising:

determining at least one updated flow parameter for the first substance after each run of the dosage-dispensing process, and storing the at least one updated flow parameter for the first substance as a numerical value or a combination of numerical values or a function in the memory module and/or in the control- and regulation unit and/or in the central database and/or delivering the at least one updated flow parameter for the first substance to the user through an input/output unit.

25. The method according to claim 24, comprising:

storing at least one substance identifier value for the substance contained in a reservoir container in the memory module and/or in the control and regulation unit and/or in the central database.

26. The method according to claim 25, comprising:

comparing the at least one flow parameter for the first substance and/or the at least one updated flow parameter for the first substance and/or at least one substance property parameter for the first substance and/or at least one condition-related parameter and/or at least one ambient parameter in the control- and regulation unit or in a separate processor unit to at least one threshold value ($K_H$) and, if the threshold value ($K_H$) is found to be exceeded, a wear exposure is registered accordingly, a wear exposure is registered accordingly and a cumulative sum ($INT_{LTH}$) of all wear exposures is calculated, or a wear exposure is registered accordingly and the cumulative sum ($INT_{LTH}$) of all wear exposures is calculated, and a permissible remaining wear exposure or remaining life time ($R_{LTH}$) of the dispensing head and/or of the substance used for dispensing is calculated by way of a comparison to a maximum value ($MAX_{LTH}$).

27. The method according to claim 26, wherein a target container that is to be filled by the dosage-dispensing device comprises a target container memory unit in which at least one substance identifier value and/or at least one substance property parameter of the substance to be dispensed into or contained in the target container is stored automatically or in response to an entry confirmation by the user.

28. The method according to claim 1, wherein the dosage-dispensing unit comprises a reservoir container and a dispensing head, and the memory module is associated with at least one of the reservoir container and the dispensing head.

29. The method according to claim 28, further comprising a memory module associated with each of the reservoir container and the dispensing head.

30. The dosage-dispensing device according to claim 18, wherein the dosage-dispensing unit comprises a reservoir container and a dispensing head, and the memory module is associated with at least one of the reservoir container and the dispensing head.

31. The dosage-dispensing device according to claim 18, further comprising a memory module associated with each of the reservoir container and the dispensing head.

* * * * *